(12) United States Patent
Ellanti et al.

(10) Patent No.: US 7,181,499 B1
(45) Date of Patent: Feb. 20, 2007

(54) METHOD, SYSTEM AND STORAGE MEDIUM FOR SIMULTANEOUS SOFTWARE IMAGE DISTRIBUTION TO MULTIPLE OPTICAL NETWORK ELEMENTS

(75) Inventors: Manohar N. Ellanti, Fremont, CA (US); Vijay R. D'Souza, Santa Clara, CA (US); Steven Langlois, Saratoga, CA (US)

(73) Assignee: CIENA Corporation, Linthicum, MD (US)

( * ) Notice: Subject to any disclaimer, the term of this patent is extended or adjusted under 35 U.S.C. 154(b) by 773 days.

(21) Appl. No.: 10/328,122

(22) Filed: Dec. 23, 2002

(51) Int. Cl.
*G06F 15/16* (2006.01)

(52) U.S. Cl. ..................................................... 709/216
(58) Field of Classification Search ................ 709/219, 709/220
See application file for complete search history.

(56) References Cited

U.S. PATENT DOCUMENTS 5,740,075 A    4/1998  Bigham et al.
5,822,519 A *  10/1998 Watanabe ................... 709/220
6,195,432 B1 * 2/2001  Takahashi et al. .......... 380/277
2004/0088348 A1 * 5/2004 Yeager et al. ............... 709/202

OTHER PUBLICATIONS

International Search Report dated Oct. 14, 2004, for PCT Application PCT/US 03/40800.

* cited by examiner

*Primary Examiner*—Bunjob Jaroenchonwanit
*Assistant Examiner*—J. Bret Dennison
(74) *Attorney, Agent, or Firm*—Clements Walker; Christopher L. Bernard; Tyler S. Brown

(57) ABSTRACT

A method, system and storage medium for synchronous communication with multiple network elements in an optical communications network. The method involves distributing software to a number of network elements. A gateway network element receives an initialization request and opens download channels to receiving network elements. The receiving network elements confirm access to the download channels and a software download is initiated simultaneously for multiple network elements. Cascaded download channels may be established for receiving network elements not in direct communication with the gateway network element.

20 Claims, 6 Drawing Sheets

METHOD, SYSTEM AND STORAGE MEDIUM FOR SIMULTANEOUS SOFTWARE IMAGE DISTRIBUTION TO MULTIPLE OPTICAL NETWORK ELEMENTS

BACKGROUND OF THE INVENTION

1. Field of Invention

The invention relates generally to optical communications networks and in particular to distribution of information to multiple optical network elements.

2. Description of Related Art

Optical communications networks utilize a variety of network elements to transmit information from sender to receiver. The network elements may be geographically distributed over a wide area and typically include one or more processors for executing network element software. One difficulty in managing communications networks is the distribution of software to multiple network elements.

One approach to distributing software is a static mechanism where copies of the software image are transmitted to one of the network elements referred to as a gateway network element (GNE) and the other network elements obtain the software image from the GNE. Multiple copies of the software image are provided from a software source to the GNE for retrieval by each requesting network element (RNE). Such a distribution technique is depicted in FIG. 6 which illustrates a download to RNEs 1, 2, 4, and 6–10. As shown in FIG. 6, this technique requires multiple (i.e., 8) streams of the software image to be distributed to the RNEs. This approach has several disadvantages including manual operation, high bandwidth requirements and the consumption of storage space on the GNE that is otherwise needed for logs, swap space, and persistent storage of network parameters.

For next-generation network elements the consumption of GNE storage space is particularly disadvantageous because each network element is a distributed processing machine containing many different types of circuit packs. Each circuit pack may support a particular set of telecommunications services such as ESCON, or ETHERNET or SONET/SDH. Each circuit pack, being similar to a processor element in a distributed processing machine, requires a software image of its own to execute. The total software image for such a network element can be on the order of 100 to 200 Mbytes, which is a significant amount of storage space for a network element. Software image size is much bigger for new generation network elements because new generation network elements, both optical and data network elements, have multiple interface cards.

Furthermore, the manual nature of this conventional software image download process is not only inefficient but also can cause unexpected results when not performed in a specific sequence. The unexpected results could include rebooting/crashing of network elements, particularly those network elements experiencing a heavy packet forwarding load.

An alternative to the static RNE-uploads-from-GNE approach in an on-the-fly distribution mechanism such as a multicast distribution mechanism based on a distribution tree. This technique requires a complex multicast routing protocol to be in place so that a download tree can be setup automatically. Multicast is un-reliable and clients/receivers join multicast session asynchronously. As a result, multicast sessions are carousel-based where the GNE continuously multicasts the software image in a cycle. This consumes resources of the GNE particularly as the size of the software image increases.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communications networks, including electrical and optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Generally speaking, the invention uses an on-the-fly distribution concept and a handshake protocol while avoiding multi-casting techniques. With the handshake protocol, all network elements that want to receive software image join the simulcast session and only then does the sender of the image start downloading to the network element that is the root of the distribution tree. When all intended receiving network elements have joined the simulcast session, the relay protocol between the network elements makes sure a topology-optimized relay chain is in place.

Figure 1:
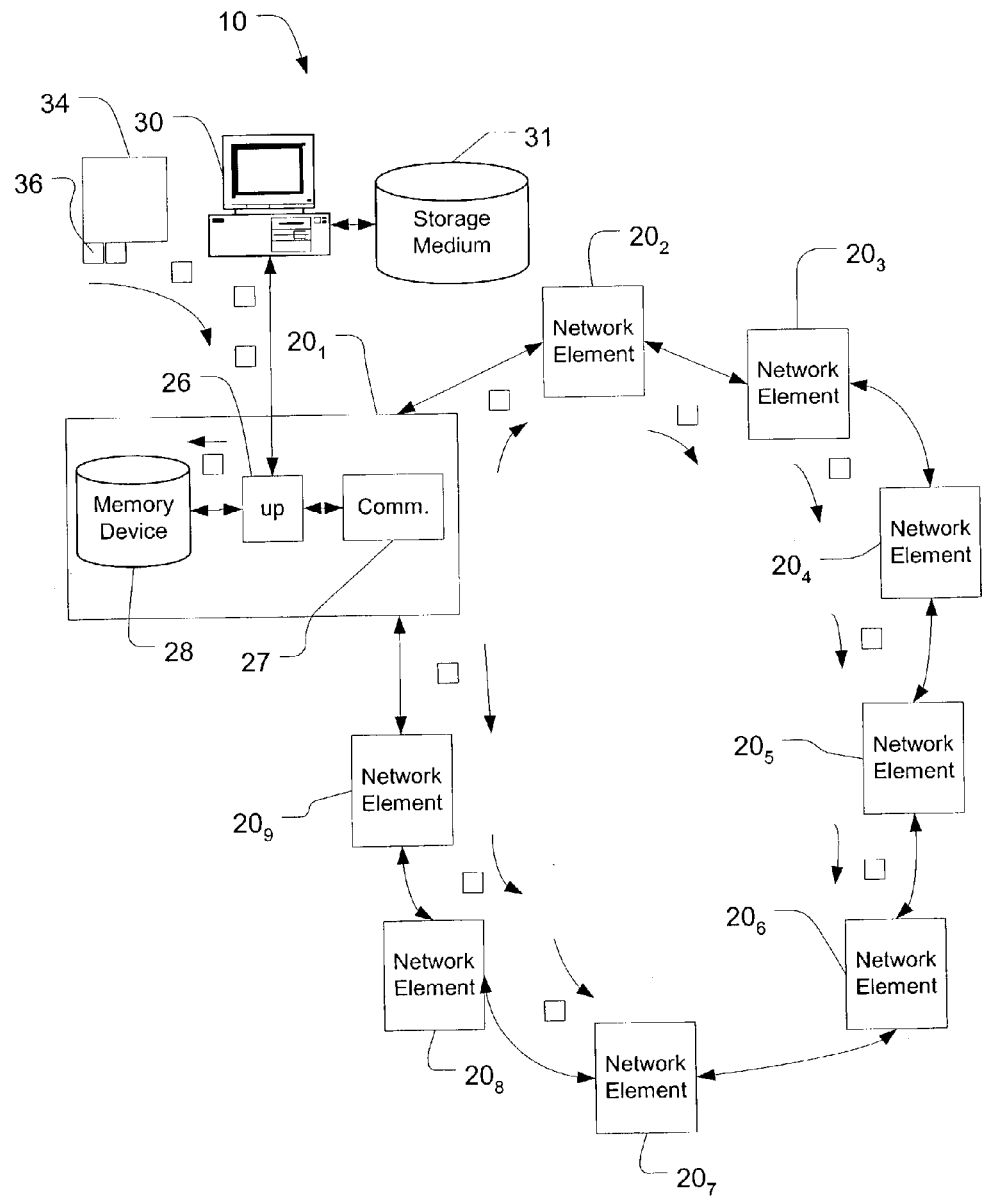
FIG. 1 is a block diagram of an exemplary communications network.

FIG. 1 is a block diagram of an exemplary communications network 10 including a network elements $20_1$–$20_9$. The network elements 20 are arranged in a ring configuration, but may appear in different network topologies as discussed herein. In each network element 20, a processor 26 executes software stored in memory device 28 to provide various network functions. Processor 26 may be implemented by one or more microprocessors executing one or more software applications in memory device 28. A communication component 27 establishes a communication path between the network elements 20. The communication path between network elements 20 may be achieved in a number of ways including in-band (e.g., on a wavelength not used for network traffic), out-of-band (e.g., on a service channel), in header bits transmitted along with network traffic, etc.

As described in further detail herein, the software in memory device 28 may be updated using a simulcast process. The network elements 20 may be any type of known network elements including cross-connects, routers, switches, amplifiers, add-drop multiplexers or terminals and may transmit information using a variety of technologies (e.g., wavelength division multiplexing or WDM).

The process of distributing software to the network elements 20 may be initiated at a software source 30 communicating with one or more network elements 20 through processor(s) 26. The software source 30 may be a general-purpose computer including a storage medium 31 accessible by software source 30. The software source 30 includes suitable input devices (e.g., keyboard, mouse) and a graphical display device (e.g., CRT). Software source 30 may be a craft terminal that connects directly to a network element 20 (e.g., RS232 connection). Alternatively, the software source 30 may access network elements 20 over one or more networks such as an overlay IP network. The software source 30 distributes software image 34 in software blocks 36 as described herein.

In one embodiment of the invention, the software source 30 initiates a simulcast distribution of software to the network elements 20. During the simulcast, one network element is designated the gateway network element (GNE) and other network elements are designated receiving network elements (RNEs). In the example shown in FIG. 1, network element $20_1$ is designated the GNE and network elements $20_2$ through $20_9$ are designated as the RNEs. Some RNEs may also serve as intermediate RNEs distributing software to downstream RNEs.

Figure 2:
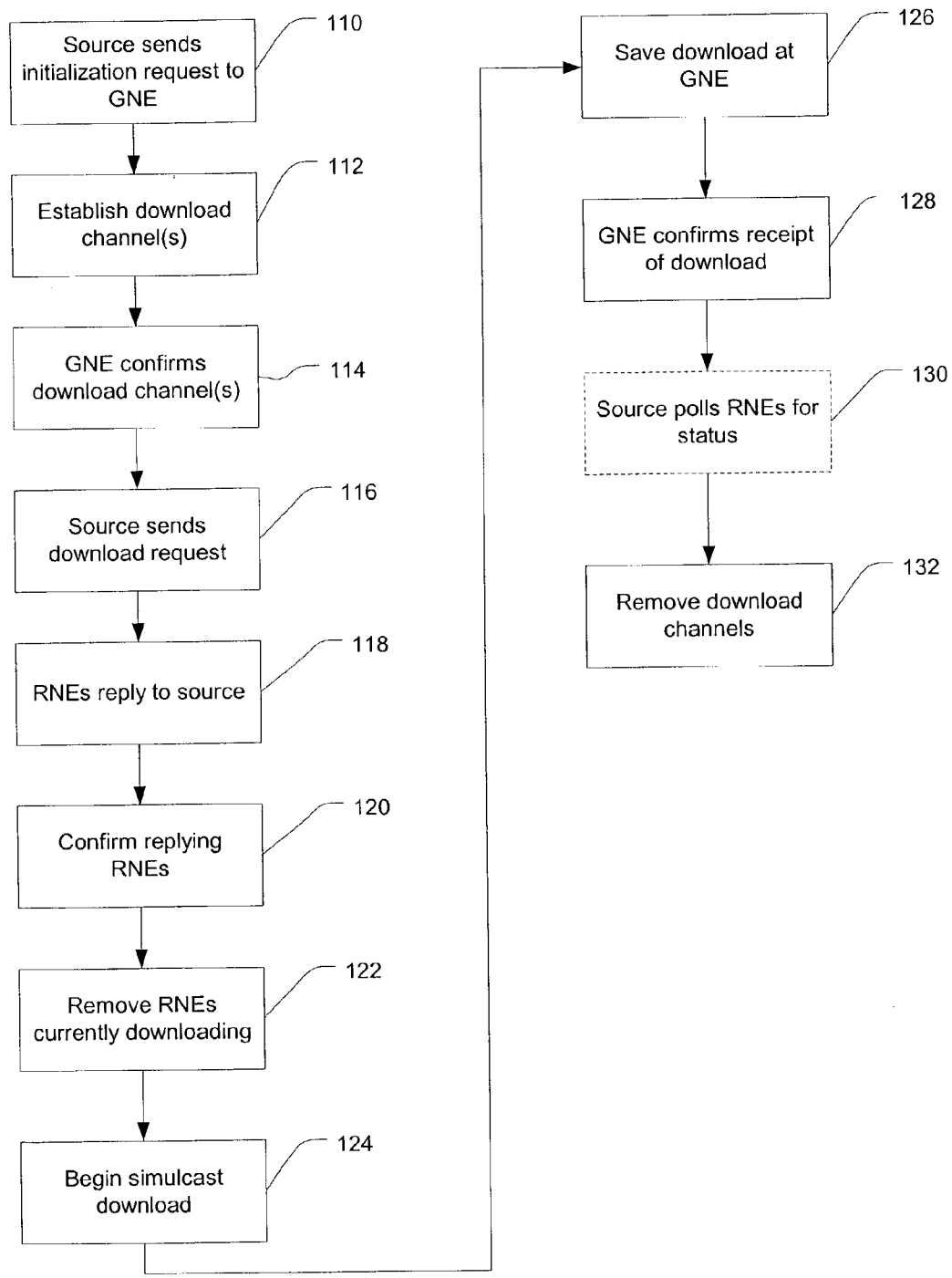
FIG. 2 is a flowchart of an exemplary process for distributing software to network elements.

FIG. 2 is flowchart of an exemplary process for simulcasting software from the software source 30 to the network elements 20. The process begins at step 110 where the software source 30 sends an initialization request to the GNE (network element $20_1$ in FIG. 1). The initialization request includes a list of all network elements that are to receive the download, the file length to be downloaded and a flag indicting whether the GNE should also download the software. The GNE may store the list of RNEs for debugging purposes. For purposes of illustration, assume that software source 30 in FIG. 1 desires to download software to RNEs $20_2$–$20_9$.

Figure 3:
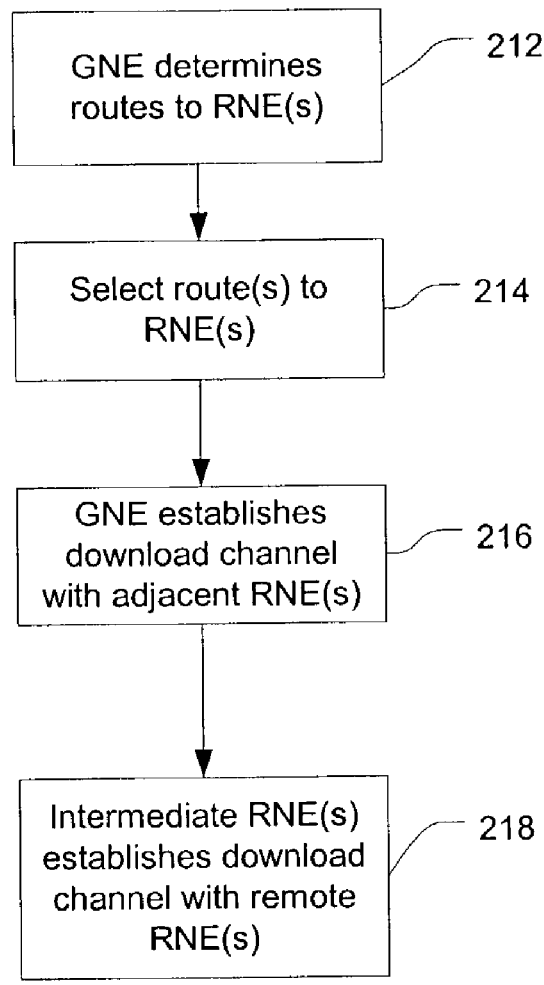
FIG. 3 is a flowchart of an exemplary process for establishing download channels.

At step 112, the download channels are established for each RNE to access to receive the download. The download channel may correspond to a socket established by communication device 27. FIG. 3 is a flowchart of an exemplary process for determining the appropriate download channels. The process begins at step 212, where the GNE executes a route tracing routine to determine possible download channels to RNEs $20_2$–$20_9$. This entails determining possible routes to RNEs $20_2$ through RNE $20_9$. In a ring network, the typical routes will be clockwise and counter clockwise. The reach of each route, however, needs to be determined.

At step 214 one or more of the possible routes is selected for establishing download channels with the RNEs. A user may manually specify the download route(s) if desired. Alternatively, this determination may be made by the GNE and/or the software source 30 based on a variety of network parameters include capacity at each RNE, channel quality between RNEs, overlap of download channels, etc. In complex network configurations (e.g., mesh) it is preferable to determine distribution routes that do not overlap so that each RNE only receives one download transmission. Of course, in a mesh configuration, each RNE may distribute the software image to multiple RNEs. Similarly, in a ring network configuration, one route will be clockwise and a second route counter clockwise around the ring, with no duplicate transmission to any RNE.

Selection of the download route may be based on a priori knowledge of the communications network configuration. For example, if it is known that the network configuration is ring or linear chain, then this topology information is used by the GNE to select the download routes. Where such information is not available, such as when the network elements are connected in a mesh topology, then unicast routing information available on the GNE is used to select the download routes. The download route should be selected so that a single download data stream exists between any two RNEs. Additionally, if any intermediate RNE lies in the shortest-path from the GNE to more than one RNE, that intermediate RNE will become a source of download data to further RNEs.

Figure 4:
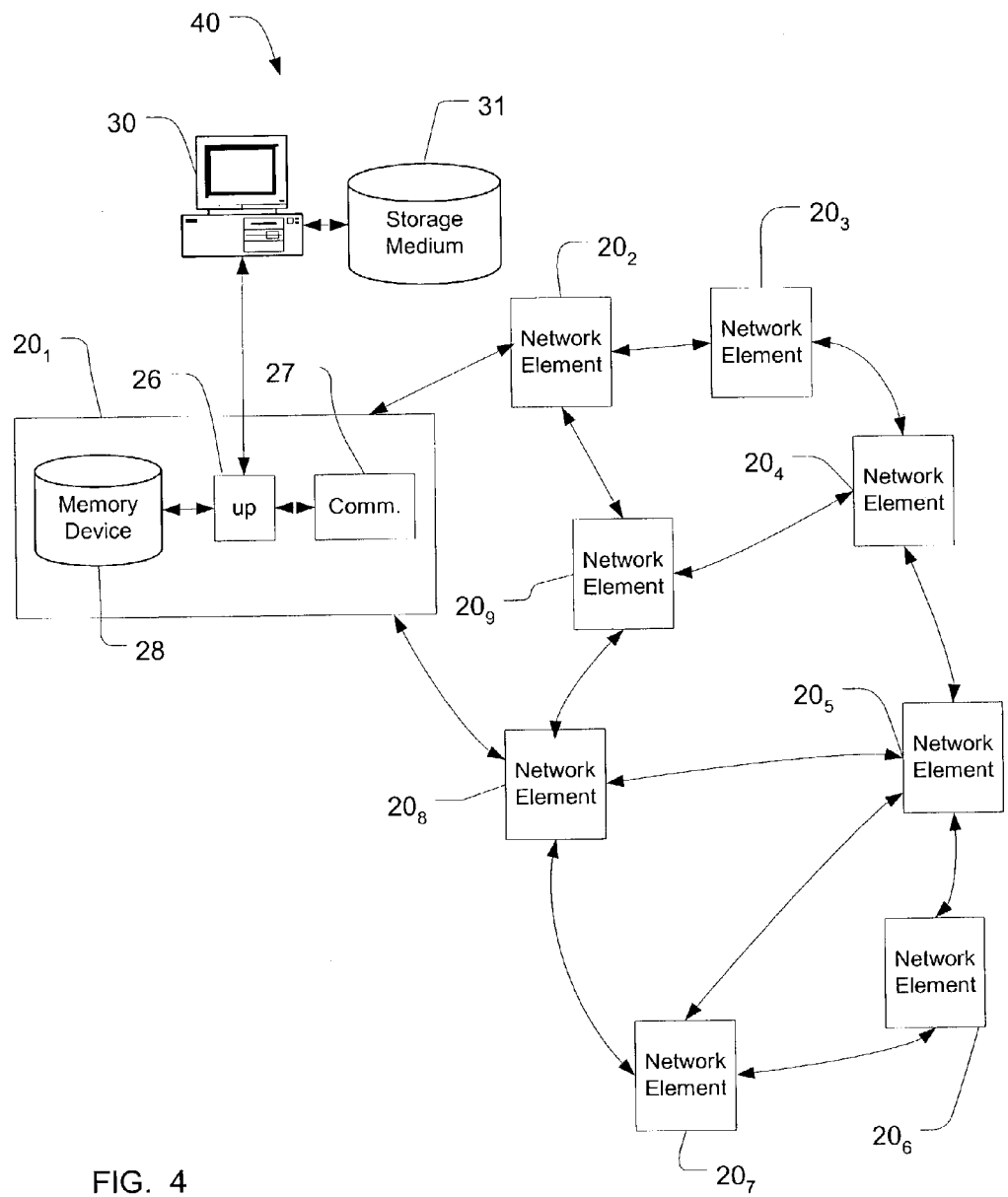
FIG. 4 is a block diagram of an exemplary communications network in an alternate embodiment.

For example, FIG. 4 shows a communication network 40 having a mesh configuration. As shown in FIG. 4, the GNE $20_1$ can reach RNE $20_4$ through RNE $20_3$ and RNE $20_9$. If the path through RNE $20_9$ happens to be the shortest-path to RNE $20_4$ from the GNE $20_1$, then RNE $20_9$ will be an intermediate RNE with two download streams emerging from it, one going to RNE $20_8$ and the other going to RNE $20_4$. The download stream from the GNE to RNE $20_3$ will terminate at the latter. Similarly if the shortest-path from the GNE to RNE $20_5$ is through RNE $20_4$, then RNE $20_4$ will be made an intermediate RNE and will service RNE $20_5$. The evaluation of shortest paths continues until a complete download tree is determined.

Once the download routes are selected, at step 216, download channels are established between the GNE and its adjacent RNEs. In the example shown in FIG. 3, download channels are created between the GNE $20_1$ and RNEs $20_2$ and $20_9$. As described above, these download channels may correspond to sockets established by communication device 27.

At step 218, a download channel is established between any intermediate RNE(s) (i.e., an RNE in the selected route between the GNE and a remote RNE at end of the route) and the remote RNE(s). The intermediate RNE is also programmed to forward a copy of the received download to the remote RNE that is next in the download tree. The process then continues with step 114 (FIG. 2) with the GNE confirming that download channels have been established to the RNEs, including any remote RNEs. For the purpose of confirming that download channels are established, each RNE can send control packets on the download channel addressed to the GNE so that GNE is aware that all RNEs in the distribution routes have established a download channel.

The process of setting up download channels can also be initiated by RNEs receiving a command from software source 30 instead of the GNE. In this alternate approach, software source 30 determines an distribution tree (with or without querying the GNE) and sends download request commands to each RNE specifying a source (e.g., GNE, intermediate RNE) from which each RNE will receive the software. The RNEs then open a download channel with the identified source.

When the download channel(s) have been established, the GNE replies to the software source 30 that the download channel(s) have been successfully established and submits a port identifier to the software source at step 114. Alternatively, a default port identifier may be established on the GNE for downloads to RNEs.

At step 116, the software source 30 then sends a download request to each of the RNEs including a GNE identifier, GNE port number (if not predefined), download file length and download file location. The RNEs attempt to access its corresponding download channel in response to the download request. The RNEs that successfully accessed the download channel with the GNE or intermediate RNE (e.g., establish a socket with communication device 27) reply to the software source 30 at step 118 that a download channel has been accessed. RNEs failing to access a download channel will either not reply or reply that a download channel has not been accessed.

At step 120, the software source 30 compares the responding RNEs confirming access to a download channel to the list of RNEs in the initialization request. Only RNEs accessing a download channel with the GNE and identified in the initialization request will receive the download. At step 122, either the software source 30 or the GNE also confirms that no downloads are currently in progress to any RNE confirming access to a download channel. If so, the responding RNE is removed from the list of RNEs and prevented from receiving the current download. Sending two downloads to an RNE at the same time could cause the RNE to crash, corrupt the downloads, etc.

The handshaking performed between the software source 30, the GNE and the RNEs may be performed over a command response channel. Since the commands and responses exchanged have minimal sizes, the command response channel does not require significant bandwidth. The command response/channel may be implemented using a variety of protocols such as a TML/HTTP, SNMP, TL1, CORBA or other management protocols. Usually, software source 30 will have an open command response channel to each network element in the network which provides a communication path for the handshaking.

At step 124, the software source 30 downloads the software to the GNE. The transfer from software source 30 to GNE may be in the form of an http PUT request with transfer encoded software blocks. The software image 34 is distributed as a sequence of software blocks 36 in a stream to the GNE and then along the download channels to the RNEs. The GNE forwards a copy of the software to each RNE over each GNE-RNE download channel. If the download is transfer encoded, the GNE strips the transfer encoded chunk length information so that only download data is forwarded to the RNEs.

The GNE may monitor download traffic to the RNEs and throttle the download if the download rate exceeds a threshold. This avoids a packet forwarding load on the GNE. Controlling the packet forwarding load on the GNE reduces the likelihood of unexpected crash/rebooting of the GNE or RNEs.

The GNE forwards the software blocks 36 to the RNEs prior to saving data in GNE memory device 28 in the event that the download channel between the software source 30 and the GNE closes immediately after the file is transferred. The delay caused by the GNE saving the software could prevent the RNEs from receiving the entire download. The GNE then saves the software in memory device 28 at step 126.

Once the file download is completed to the GNE and the RNE(s), the GNE confirms receipt of the download at step 128 by sending a confirmation to the software source 30. At step 130, the software source 30 may optionally send status requests to each RNE to confirm receipt of the entire download. The download channels between the software source 30 and the GNE and the GNE and the RNEs are removed at step 132.

The process may be repeated for any RNEs that could not access a download channel. In this scenario, the initialization request includes a list of RNEs that have not previously received the download. The flag in the initialization request is set so that the GNE does not store a copy of the software.

FIG. 4 is a block diagram of an alternate communications network 40 in which the network elements 20 are arranged in a mesh topology. The process of distributing the software image 34 is similar to that described above. The possible routes from the GNE to the RNEs, however, can vary significantly in the mesh topology. The route selection preferably occurs so that each RNE receives the software image and duplicate transmission paths are avoided.

In the embodiments described above, topology-driven download routes are selected so that there is a limited number of streams in which the software image is flowing in the network. Using topology-driven distribution routes avoids the limitations of conventional techniques by first identifying the underlying physical connectivity and using the network elements on a given physical topology to relay an incoming software image to an outgoing link.

In a ring network of FIG. 1, one download route may be in the clockwise direction and another download route may be in the counter clockwise direction. The GNE $20_1$ copies the software image only two times, once to the east (clockwise) and west (counter-clockwise) outgoing links. As a result, the two outgoing links contain only one copy of the software image and bandwidth of the outgoing links is not wasted. If the intermediate RNE has only one next neighbor, then it relays only once. If an intermediate RNE has multiple next neighbors then it may relay multiple times.

In more complex networks, such as the mesh network of FIG. 4, the download routes are determined based on the unicast routing protocol information. From the unicast routing protocol information, the topology of the network is determined and efficient distribution route(s) selected. The topology information may also be manually inputted into software source 30 or into the GNE. As longs the stored topology information matches with the real physical topology at the time of download, the end result is the same, establishment of efficient download route(s). The GNE or the software source 30 can select the download routes. If the GNE determines the download routes, the determined download routes may be provided to the software source 30.

Figure 5:
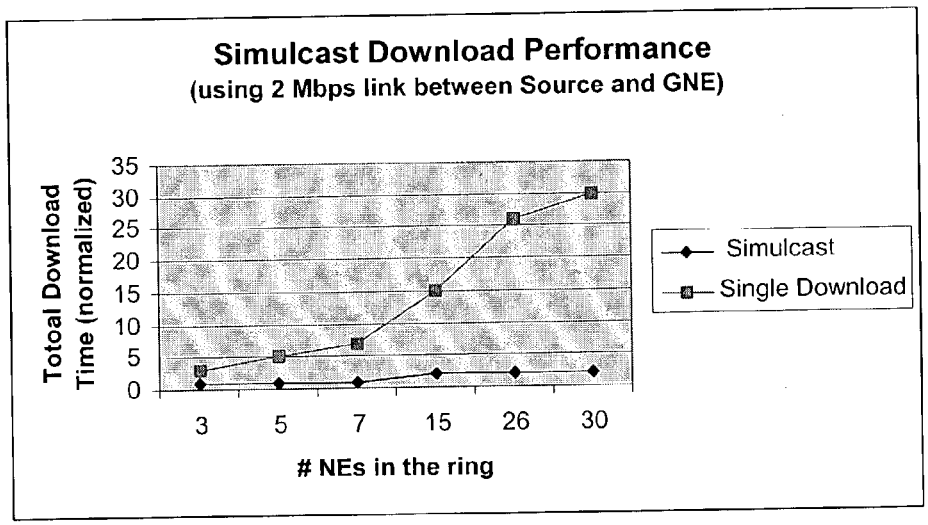
FIG. 5 is a graph of download time versus number of network element.
Figure 6:
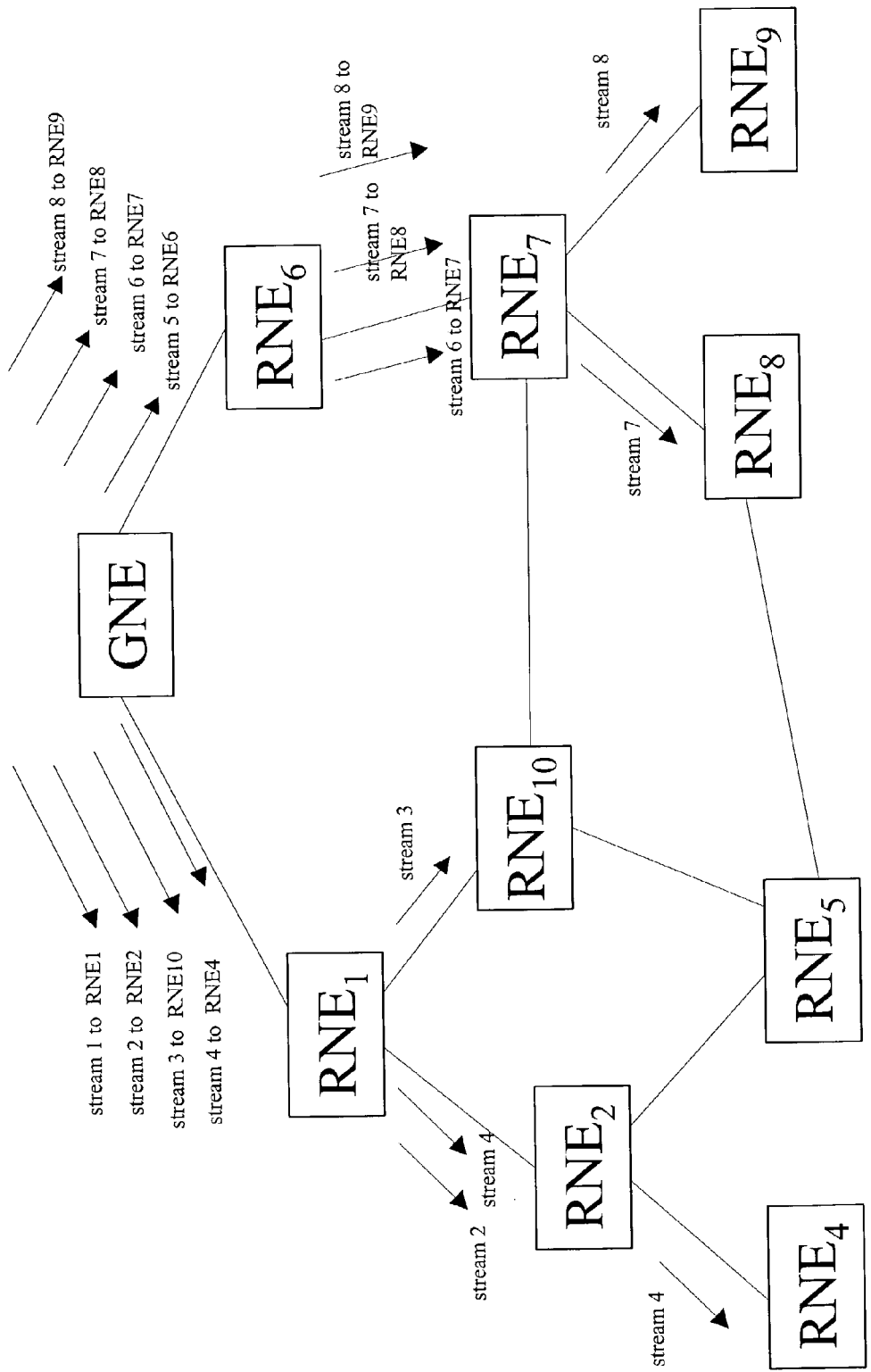
FIG. 6 illustrates download of a software image using conventional techniques.

FIG. 5 is a graph of download time versus number of network elements including a plot for a conventional technique where a separate software image is submitted for each RNE and a plot for the simulcast technique disclosed herein. In the examples plotted in FIG. 5, a 2 Mbps link exists between the software source 30 and the GNE. As is evident, the simulcast technique provides the software image to the network elements in significantly less time, particularly as the size of the network increases.

The software distribution process provides a synchronous download that is initiated once the recipient RNEs are identified and the download channels are in place. The GNE and intermediate network elements serving as GNEs for remote RNEs do not need to temporarily store the software for distribution. The duplication and distribution occurs on-the-fly. This reduces memory requirements for the GNE. Bandwidth usage is reduced between the software source, the GNE and RNEs as only a single download transmission is sent between network elements, rather than multiple copies of the same transmission.

Distributing the software image 34 in software blocks 36 allows the GNE and the RNEs to receive the entire software image at substantially the same time. This avoids the situation where network elements are executing different versions of software which may lead to incompatibilities. For example, if the software image relates to inter-network element communications (e.g., neighbor discovery routines) then each network element may need the current software image for this communication to be implemented. If network elements are executing different versions of software, this can lead to network elements crashing or network functions being inoperable.

Embodiments of the invention may be particularly useful depending on the communication links between the network elements. SONET/SDH embedded operations channels (EOC or DCC), optical supervisory channels (OSC) and ethernet links transported over optical or electrical medium typically have bandwidth limitations. Embodiments of the invention described herein reduce the bandwidth consumption between network elements by reducing the number of software images transmitted between network elements.

Embodiments of the invention may be particularly useful when implemented in SONET/SDH or BLSR/UPSR network rings. The network elements in these kinds of networks are important for network operation. Software upgrades should be done quickly and efficiently so that the chance for downtime reduced. Embodiments of the invention achieve rapid downloads even over small available bandwidth.

As described above, the process of distributing the software is implemented by processor-based systems including the software source and the network elements. Thus, the invention may be embodied in the form of a computer program code including instructions embodied in tangible media, such as floppy diskettes, CD-ROMs, hard drives, memory or any other computer-readable storage medium, wherein, when the computer program code is loaded into and executed by a processor, the processor becomes an apparatus for practicing an embodiment of the invention. Also included may be embodiments in the form of computer program code, for example, whether stored in a storage medium, loaded into and/or executed by a processor, or as a data signal transmitted, whether a modulated carrier wave or not, over some transmission medium, such as over electrical wiring or cabling, through fiber optics, or via electromagnetic radiation, wherein, when the computer program code is loaded into and executed by a processor, the processor becomes an apparatus for practicing the embodiment of the invention. When implemented on a general-purpose microprocessor, the computer program code segments configure the microprocessor to create specific logic circuits.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for distributing software in an optical communications network from a software source to at least one receiving network element through a gateway network element, the method comprising:
    sending an initialization request from the software source to the gateway network element;
    establishing a download channel at the gateway network element for the at least one receiving network element, the gateway network element confirming establishment of the download channel with the software source and submitting a port identifier to the software source when a default port identifier has not previously been established on the gateway network element for downloads to the at least one receiving network element;
    sending a download request from the software source to the at least one receiving network element;
    the at least one receiving network element accessing the download channel and sending a confirmation of access to the download channel to the software source;
    downloading the software to the gateway network element using transfer encoded software blocks in a stream;
    stripping the transfer encoded portion from the transfer encoded software blocks such that the at least one receiving network element receives only download data; and
    forwarding the software from the gateway network element to the at least one receiving network element if the at least one receiving network element confirms access to the download channel; and
    wherein the gateway network element monitors the software forwarding and throttles the software forwarding if a forwarding rate exceeds a threshold.

2. The method of claim 1 wherein:
    the initialization request includes a list of receiving network elements to receive the software, the file length of the software and a flag,
    said downloading including the gateway network element storing the software in response to the state of the flag.

3. The method of claim 2 wherein:
    said downloading includes downloading the software to the at least one receiving network element if the at least one receiving network element confirms access to the download channel and the at least one receiving network element is listed on the list of receiving network elements in the initialization request.

4. The method of claim 3 wherein:
    said downloading includes downloading the software to the at least one receiving network element if the at least one receiving network element confirms access to the download channel and the at least one receiving network element is listed on the list of receiving network elements in the initialization request and the at least one receiving network element is not currently downloading.

5. The method of claim 1 further comprising:
    the gateway network element sending a confirmation of receipt of the software to the software source.

6. The method of claim 1 further comprising:
    the software source polling the at least one receiving network element to determine if the at least one receiving network element has received the software.

7. The method of claim 1 further comprising:
    removing the download channel upon downloading the software to the at least one receiving network element.

8. The method of claim 1 wherein:
    the download request includes a gateway network element identifier, the file length and download file location;
    the at least one receiving network element accessing the download channel in response to the download request.

9. The method of claim 1 wherein:
    the at least one receiving network element includes a first receiving network element, a second receiving network element and a remote receiving network element;
    said establishing the download channel includes determining a plurality of routes from the gateway network element to the remote receiving network element, selecting one of the routes including the first receiving network element and establishing a download channel from the gateway network element to the first receiving network element and from the first receiving network element to the remote receiving network element.

10. The method of claim 9 wherein:

said downloading includes the first receiving network element receiving the software, forwarding a duplicate of the software to the remote receiving network element and storing the software at the first receiving network element.

11. An optical communications network comprising:

a software source containing software for distribution;

a gateway network element in communication with said software source;

at least one receiving network element in communication with said gateway network element;

said software source sending an initialization request to said gateway network element;

said gateway network element establishing a download channel with said at least one receiving network element, said gateway network element confirming establishment of the download channel with said software source and submitting a port identifier to the software source when a default port identifier has not previously been established on the gateway network element for downloads to the receiving network element;

said software source sending a download request to said at least one receiving network element;

said gateway network element downloading the software using transfer encoded software blocks in a stream;

said gateway network element stripping the transfer encoded portion from the transfer encoded software blocks such that the at least one receiving network element receives only download data;

said at least one receiving network element accessing the download channel and sending a confirmation of access to the download channel to said software source; and said gateway network element forwarding the software to said at least one receiving network element if said at least one receiving network element confirms access to the download channel; and wherein the gateway network element monitors the software forwarding and throttles the software forwarding if a forwarding rate exceeds a threshold.

12. The system of claim 11 wherein:

the initialization request includes a list of receiving network elements to receive the software, the file length of the software and a flag;

gateway network element storing the software in response to the state of the flag.

13. The system of claim 12 wherein:

said software source downloads the software to said at least one receiving network element if said at least one receiving network element confirms access to the download channel and said at least one receiving network element is listed on the list of receiving network elements in the initialization request.

14. The system of claim 13 wherein:

said software source downloads the software to said at least one receiving network element if said at least one receiving network element confirms access to the download channel and said at least one receiving network element is listed on the list of receiving network elements in the initialization request and said at least one receiving network element is not currently downloading.

15. The system of claim 11 wherein:

said gateway network element sends a confirmation of receipt of the software to said software source.

16. The system of claim 11 wherein:

said software source polls said at least one receiving network element to determine if said at least one receiving network element has received the software.

17. The system of claim 11 wherein:

one of said at least one receiving network element and said gateway network element removes the download channel upon downloading the software to said at least one receiving network element.

18. The system of claim 11 wherein:

the download request includes a gateway network element identifier, the file length and download file location;

said at least one receiving network element accessing the download channel in response to the download request.

19. The system of claim 11 wherein:

said at least one receiving network element includes a first receiving network element, a second receiving network element and a remote receiving network element;

said gateway network element determines a plurality of routes from said gateway network element to said remote receiving network element, selects one of the routes including said first receiving network element and establishes a download channel from said gateway network element to said first receiving network element, said first receiving network element establishing a download channel from said first receiving network element to said remote receiving network element.

20. The system of claim 19 wherein:

said first receiving network element receives the software, forwards a duplicate of the software to said remote receiving network element and stores the software at said first receiving network element.

* * * * *